United States Patent [19]

Conlan

[11] Patent Number: 4,818,412
[45] Date of Patent: Apr. 4, 1989

[54] APPARATUS AND PROCESS FOR FEEDING HYPOCHLORITE SOLUTION

[75] Inventor: John T. Conlan, Ventura, Calif.
[73] Assignee: Betz Laboratories, Inc., Trevose, Pa.
[21] Appl. No.: 847,081
[22] Filed: Apr. 1, 1986
[51] Int. Cl.$^4$ ............................................. C02F 1/72
[52] U.S. Cl. .................................... 210/704; 210/709; 210/746; 210/756; 210/764; 210/96.1; 210/198.1; 210/206; 210/209; 210/221.1; 210/221.2; 166/75.1
[58] Field of Search ............... 210/709, 746, 756, 764, 210/704, 96.1, 198.1, 206, 209, 220, 754, 755, 221.1, 221.2; 166/75.1

[56] References Cited

U.S. PATENT DOCUMENTS

| | | | |
|---|---|---|---|
| 3,710,867 | 1/1971 | Bansbach | 166/244 |
| 3,716,485 | 2/1973 | Robertson | 210/709 |
| 3,733,266 | 5/1973 | Bishop | 210/754 |
| 4,033,871 | 7/1977 | Wall | 210/96.1 |
| 4,224,154 | 9/1980 | Steininger | 210/96.1 |
| 4,323,092 | 4/1982 | Zabel | 210/96.1 |
| 4,340,488 | 7/1982 | Toth | 210/764 |
| 4,340,489 | 7/1982 | Adams | 210/764 |
| 4,384,961 | 5/1983 | Abrams | 210/756 |
| 4,385,973 | 5/1983 | Reis | 210/746 |
| 4,393,037 | 7/1983 | Delaney | 210/764 |
| 4,435,291 | 3/1984 | Matsko | 210/96.1 |

FOREIGN PATENT DOCUMENTS

| | | | |
|---|---|---|---|
| 2449951 | 5/1975 | Fed. Rep. of Germany | 210/96.1 |
| 60-202792 | 10/1985 | Japan | 210/96.1 |
| 876741 | 9/1961 | United Kingdom | 210/764 |

OTHER PUBLICATIONS

Smith, "Commissioning and Operational Experiences of Java Seawater Treating Facility," J. of Pet. Tech. 7/85, pp. 1276–1284.
Chang, "Water Quality Considerations in Malaysia's First Waterflood," J. of Pet. Tech., 9/85, pp. 1689–1698.
Dulcometer® Redox Controller, Bulletin Number DM-109, Oct. 1983.
Prominent® Electronic Metering Pumps, Bulletin Number PM-EH-100, May 1983.

*Primary Examiner*—Ernest G. Therkorn
*Attorney, Agent, or Firm*—Alexander D. Ricci; Roslyn T. Tobe

[57] ABSTRACT

An improved apparatus and process for feeding hypochlorite solution from a source of the solution to a device for removing impurities from water in a water treatment system is disclosed. The improvement comprises a first means for continuously measuring the oxidation/reduction potential of the effluent water of the device, and a second means operatively connected to the first means and the pump means continuously controlling the feed-rate of the pump means in response to the measured oxidation/reduction potential of the effluent water, thereby maintaining a predetermined oxidation/reduction potential in the effluent water of the device.

16 Claims, 1 Drawing Sheet

4,818,412

APPARATUS AND PROCESS FOR FEEDING HYPOCHLORITE SOLUTION

BACKGROUND OF THE INVENTION

1. Field of the Invention

This invention relates to an apparatus and process for feeding hypochlorite solution form a source of the solution to a device for removing impurities from water in a water treatment system.

2. Description of the Prior Art

In many water treatment systems, particularly oilfield water systems, filters must be treated with biocides to control bacterial contamination. Bacterial contamination of filter media, if left uncontrolled, can cause bacterial contamination and subsequent corrosion of downstream equipment and wells, produce high hydrogen sulfide ($H_2S$) levels in the filter effluent, and cause decreased filtration efficiency due to plugging of the media with biomass.

Many types of biocides have been employed in treating oilfield filtration systems, including: acrolein, glutaraldehyde, quaternary amines, gaseous chlorine, chlorine dioxide and sodium hypochlorite solution. While all of these biocides are effective in killing sulfate-reducing bacteria and other undesirable bacteria, only acrolein, chlorine, chlorine dioxide and hypochlorite react directly with hydrogen sulfide. Furthermore, only chlorine, chlorine dioxide and hypochlorite react to convert ferrous iron to filterable ferrix oxide. Therefore, the best results in terms of oilfield water filter performance and filter effluent water quality are obtained when using either chlorine, chlorine dioxide or hypochlorite solutions to treat oilfield filters.

Hypochlorite solutions are typically applied to the filter in one of three ways: continuous addition at a constant rate to the filter inlet; intermittent "shot" feeding to the filter inlet; and addition to the filter backwash water during the backwash cycle. However, each of these treatment methods suffers from its own disadvantage. For example, continuous addition of a fixed concentration of biocide does not account for the fact that bacterial contamination levels within a filter vessel change as a function of the filtration cycle. Bacterial populations are usually at their lowest levels immediately following a backwash cycle. However, as a filter progresses through its service cycle, debris in the form of oil, sediment and biomass accumulates and bacterial population levels increase. Because of this phenomenon, a fixed, continuous biocide feed-rate results in a wasteful overfeed at the beginning of a service cycle and an ineffective underfeed at the end of a service cycle.

Intermittent "shot" feeding allows a relatively high concentration of biocide to be fed during the period of the shot. This provides good disinfection of the filters during the shot and for a period of time afterward. However, as noted above, biomass and other debris accumulate in the filter media continuously throughout a service cycle. This promotes a rapid proliferation of bacteria whenever biocide is not present. Also, $H_2S$ and dissolved ferrous iron are typically present in the influent water to oilfield water filters. These undesirable contaminants pass through the filter whenever oxidizing biocide is not being fed.

Addition of biocide during the filter backwash typically accomplishes good disinfection of the filter media. However, as noted above, bacterial recontamination occurs fairly rapidly and there is no effective removal of $H_2S$ and ferrous iron during the service cycle.

SUMMARY OF THE INVENTION

This invention relates to an improved apparatus having a pump means for feeding a hypochlorite solution, such as sodium hypochlorite solution, from a source of the solution to a device for removing impurities from water in a water treatment system, such as an oilfield water treatment system, wherein the improvement comprises a first means for continuously measuring the oxidation/reduction potential of the effluent water of the device, and a second means operatively connected to the first means and the pump means for continuously controlling the feed-rate of the pump means in response to the measured oxidation/reduction potential of the effluent water, thereby maintaining a predetermined oxidation/reduction potential in the effluent water of the device. This invention also relates to an improved process for feeding a hypochlorite solution from a source of the solution to a device for removing impurities from water in a water treatment system, wherein the improvement comprises continuously measuring the oxidation/reduction potential of the effluent water of the device, and continuously controlling the feed-water of a pump means in response to the measured oxidation/reduction potential of the effluent water so that a predetermined oxidation/reduction potential is maintained in the effluent water of the device.

There are several advantages associated with this invention as compared to prior art apparatus and processes. The advantages include an ability to optimally achieve the following results with the lowest effective hypochlorite solution feed-rate:

the reduction of sulfate-reducing bacteria levels and other bacterial contamination within the filter media;

the elimination of dissolved hydrogen sulfide in the filter effluent; and a reduction in the concentration of dissolved ferrous iron in the filter effluent.

DETAILED DESCRIPTION OF THE PREFERRED EMBODIMENT

Figure 1:
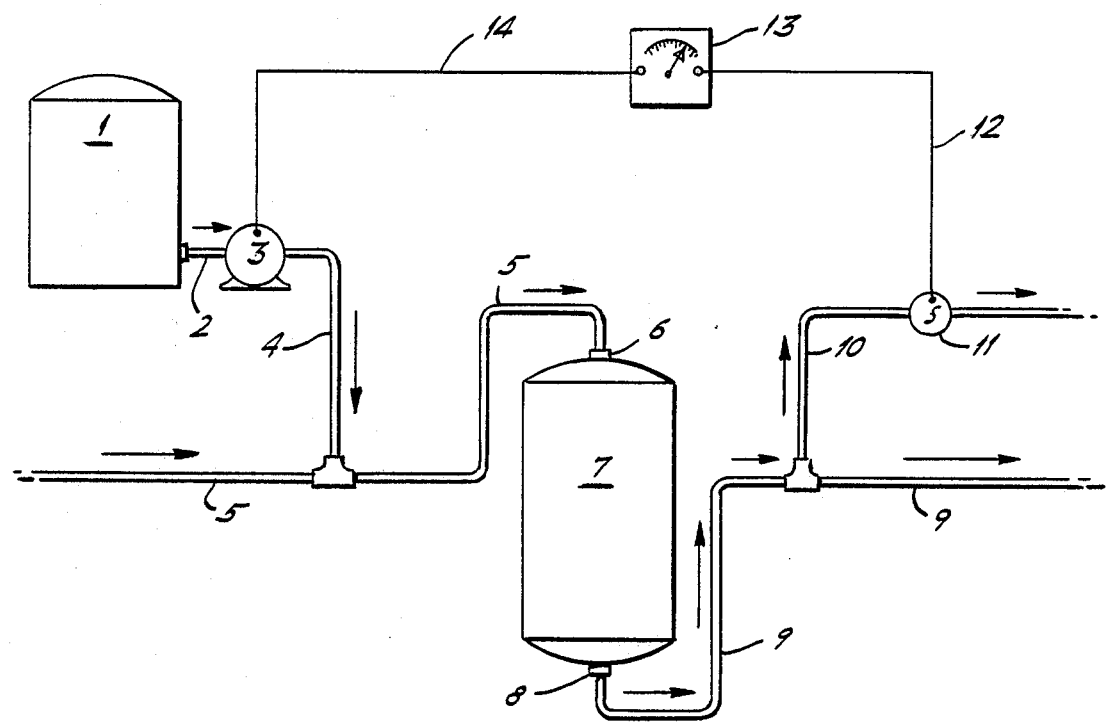
FIG. 1 is a schematic diagram of a portion of a water treatment system utilizing an apparatus in accordance with the instant invention and for carrying out the method of the instant invention.

The present invention provides for an improved apparatus and process for feeding hypochlorite solution from a source of the solution to a device for removing impurities from water, such as a filter or flotation cell, in a water treatment system. Oxidation/ reduction potential is directly related to the concentration of hypochlorite solution in water. The apparatus improvement of this invention comprises a first means for continuously measuring the oxidation/reduction potential of the effluent water of the device, and a second means, operatively connected to the first means and a pump means, for continuously controlling the feed-rate of the pump means. Preferably, the first means comprises an oxidation/reduction potential sensor or electrode arranged to contact the effluent water of the device for producing an electrical millivolt signal responsive to the oxidation/reduction potential of the effluent water. It is also preferred that the second means compares the millivolt signal to a predetermined oxidation/reduction value to produce an oxidation/reduction potential deviation value and converts the deviation value to a control signal for controlling the feed-rate of the pump means. The pump means can be a variable pump controlled by the control signal for feeding the solution to the influent water of the device.

A clear understanding of the present invention can be had by reference to the accompanying drawing. Although a specific form of the invention has been selected for illustration in the drawing itself, the description thereof is not intended to limit the scope of the present invention.

FIG. 1 illustrates the preferred embodiment of the apparatus constructed in accordance with the present invention and for performing the method of this invention. Hypochlorite solution is supplied to a pump means 3 from a source of hypochlorite solution 1 by a hypochlorite inlet conduit 2. The pump means 3 is operable to pump or feed the solution from the source of the solution 1 to the influent water of a filter 7. Preferably, the pump means 3 is a variable pump having a variable stroke rate for pumping the solution. The source of hypochlorite solution 1 can be any suitable delivery or storage vessel containing the solution. The hypochlorite inlet conduit 2 connects the source of hypochlorite solution 1 to the input of the pump means 3. The output of the pump means 3 is connected to a hypochlorite outlet conduit 4 which serves to carry the solution to the influent water of the filter 7. A water influent conduit 5 in a water treatment system is connected to an inlet 6 of the filter 7 for carrying influent water to the filter 7. The hypochlorite outlet conduit 4 is connected to the water influent conduit 5. Alternatively, the hypochlorite outlet conduit 4 can be connected directly to the inlet 6 of the filter 7.

The filter 7 is any suitable type of water filter known in the art for filtering solids and other undesirable debris from the water in the system. The effluent water of the filter 7 is discharged through an outlet 8 of the filter 7. A water effluent conduit 9 connected to the outlet 8 of the filter 7 carries the effluent water to be further utilized in the water treatment system.

An oxidation/reduction potential electrode 11 is contacted with or exposed to a slipstream of the effluent water from the filter 7. The oxidation/reduction potential electrode 11 is capable of continuously measuring the oxidation/reduction potential of the effluent water to produce an electrical millivolt signal responsive to the measured oxidation/reduction potential of the effluent water. A slipstream conduit 10 for carrying a slipstream or portion of the effluent water is connected to the water effluent conduit 9. The oxidation/reduction potential electrode 11 is coupled to the slipstream conduit 10. After the effluent water is exposed to the oxidation/reduction potential electrode 11, the slipstream conduit 10 can thereafter return the slipstream to the remaining effluent water to be further utilized in the water treatment system. Alternatively, the oxidation/reduction potential electrode 11 can be arranged in-line coupled directly to the water effluent conduit 9 for contacting the effluent water.

The oxidation/reduction potential electrode 11 is electrically connected to a control unit 13 by a first electrical circuit 12. The control unit 13 is further electrically connected to the pump means 3 by a second electrical circuit 14. The control unit 13 is operable to amplify and convert the electrical millivolt signal produced by the oxidation/reduction potential electrode 11 to an analog or digital control signal for automatically controlling the feed-rate of the pump means 3. The analog or digital control signal which is produced by the control unit 13 is proportional to the measured oxidation/reduction potential of the effluent water and this control signal can then be utilized to control the rate of pumping of the pump means 3.

The control unit 13 has an adjustable oxidation/reduction potential set point which can be set at a desirable predetermined oxidation/reduction potential value. The control unit 13 is operable to amplify the electrical millivolt signal, continuously compare the electrical millivolt signal produced by the oxidation/reduction potential electrode 11 with the predetermined oxidation/reduction potential value to produce an oxidation/reduction potential deviation value, and then to convert the obtained deviation value to the analog or digital control signal for controlling the feed-rate of the pump means 3. A large deviation value produces a high feed-rate or high pump stroke rate and a small deviation value produces a low feed-rate or low pump stroke rate. Thus, the control unit 13 is capable of automatically increasing the feed-rate of the pump means 3 until the predetermined oxidation/reduction value is reached in the filter effluent water and reducing the feed-rate of pump means 3 to hold the oxidation/reduction potential of the filter effluent water at the predetermined level.

The improvement of the instant invention can also be used with other suitable devices known in the art for removing impurities from water, such as a flotation cell. For example, the improvement can be used with the flotation cell instead of the filter 7 in the water treatment system or the improvement can even be used with the flotation cell or other suitable device in combination with the filter 7 in the system.

In the preferred embodiment, the improved process of the instant invention for feeding hypochlorite solution from a source of the solution to a water filter in a water treatment system comprises: continuously measuring the oxidation/reduction potential of the effluent water of the filter to produce a millivolt signal responsive to the oxidation/reduction potential of the effluent water; amplifying the millivolt signal; comparing the millivolt signal to a predetermined oxidation/reduction value to produce an oxidation/reduction potential deviation value; converting the oxidation/reduction potential deviation value to a control signal; and varying the feed-rate of a variable pump feeding the solution to the influent water of the filter in response to the control signal so that the predetermined oxidation/reduction value is maintained in the effluent water of the filter.

The term "hypochlorite solution" as used herein means an aqueous solution of a metallic salt of hypochlorous acid. Any solution of alkali or alkali-earth metal hypochlorite can be used in accordance with this invention. Preferably, the solution is sodium hypochlorite and, most preferably, about 12.5% sodium hypochlorite solution, which is presently the most economical and readily available solution. It is also preferred that the water treatment system is an oilfield water treatment system. Sodium hypochlorite solution is very effective in killing sulfide-producing bacteria when $0Cl^-$ residuals between 0.5 ppm and 1.0 ppm are maintained in oilfield waters. Therefore, a calibration curve for oxidation/reduction potential vs. $0Cl^-$ concentration can be established for each location at which the instant invention is to be employed. The oxidation/reduction set point of the control unit can then be adjusted so that the oxidation/reduction potential of the filter effluent water reflects a desired sodium hypochlorite concentration of 0.5 ppm to 1.0 ppm.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the invention.

What is claimed is:

1. An improved apparatus having a pump means for feeding a hypochlorite solution from a souce of the solution to a device for removing impurities from water in a water treatment system, wherein the improvement comprises:
    (a) first means for continuously measuring the oxidation/reduction potential of the effluent water of the device, and
    (b) second means operatively connected to the first means and the pump means for continuously controlling the feed-rate of the pump means in response to the measured oxidation/reduction potential of the effluent water, thereby maintaining a predetermined oxidation/reduction potential in the effluent water of the device.

2. The apparatus of claim 1 wherein the solution is sodium hypochlorite solution.

3. The apparatus of claim 2 wherein the water treatment sytem is an oilfield water treatment system.

4. The apparatus of claim 3 wherein the first means comprises an oxidation/reduction potential electrode arranged to contact the effluent water of the device for producing a millivolt signal responsive to the oxidation/reduction potential of the effluent water.

5. The apparatus of claim 4 wherein the second means compares the millivolt signal to a predetermined oxidation/reduction value to produce an oxidation/reduction potential deviation value and converts the deviation value to a control signal for controlling the feed-rate of the pump means.

6. The apparatus of claim 5 wherein the pump means is a variable pump controlled by the control signal for feeding the solution to the influent water of the device.

7. The apparatus of claim 6 wherein the device is a filter.

8. The apparatus of claim 6 wherein the device is a flotation cell.

9. An improved process for feeding a hypochlorite solution from a source of the solution to a device for removing impurities from water in a water treatment system, wherein the improvement comprises:
    (a) continuously measuring the oxidation/reduction potential of the effluent water of the device, and
    (b) continuously controlling the feed-rate of a pump means in response to the measured oxidation/reduction potential of the effluent water so that a predetermined oxidation/reduction potential is maintained in the effluent water of the device.

10. The process of claim 9 wherein the solution is sodium hypochlorite solution.

11. The process of claim 10 wherein the water treatment system is an oilfield water treatment system.

12. The process of claim 11 wherein the device is a filter.

13. The process of claim 11 wherein the device is a flotation cell.

14. An improved process for feeding a hypochlorite solution from a source of the solution to a water filter in a water treatment system, wherein the improvement comprises:
    (a) continuously measuring the oxidation/reduction potential of the effluent water of the filter to produce a millivolt signal responsive to the oxidation/reduction potential of the effluent water,
    (b) amplifying the millivolt signal,
    (c) comparing the millivolt signal to a predetermined oxidation/reduction value to produce an oxidation/reduction potential deviation value,
    (d) converting the oxidation/reduction potential deviation value to a control signal, and
    (e) varying the feed-rate of a variable pump feeding the solution of the influent water of the filter in response to the control signal so that the predetermined oxidation/reduction potential value is maintained in the effluent water of the filter.

15. The process of claim 14 wherein the solution is sodium hypochlorite solution.

16. The process of claim 15 wherein the water treatment system is an oilfield water treatment system.

* * * * *